Nov. 10, 1931.  F. R. BEAL  1,831,475
AUTOMOBILE LIFTING DEVICE
Filed Aug. 21, 1929  2 Sheets-Sheet 1
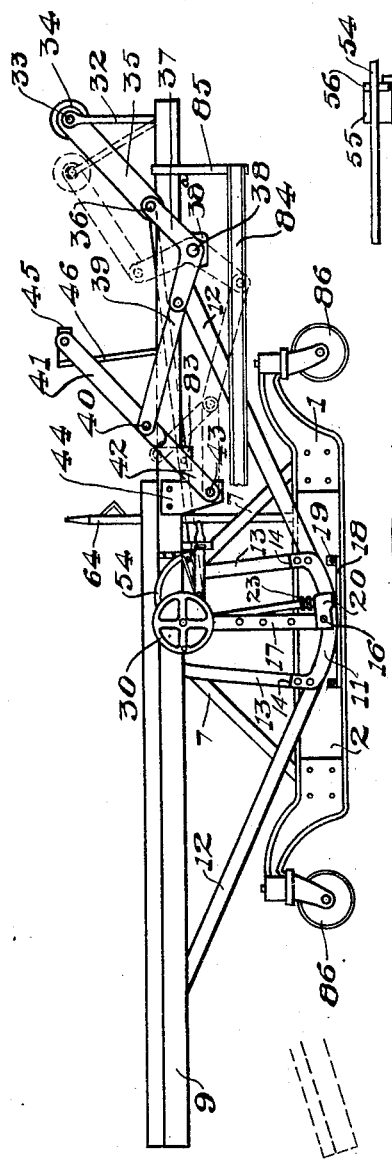
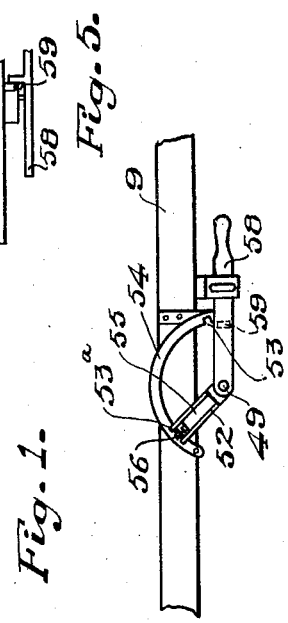
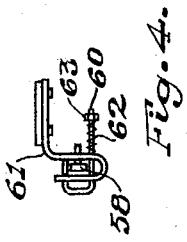
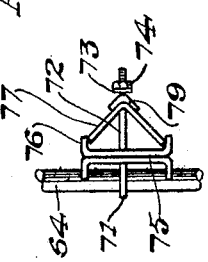
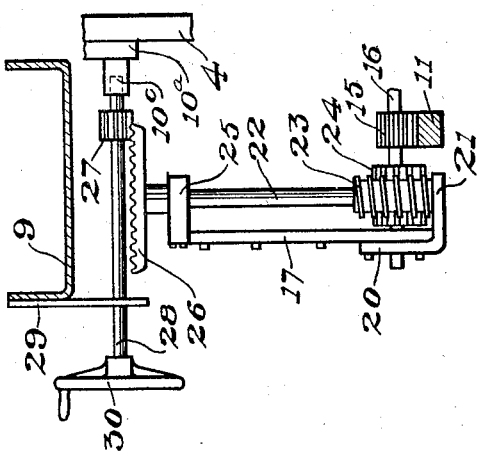
INVENTOR,
BY Francis R. Beal,
Howard S. Smith,
ATTORNEY Nov. 10, 1931. F. R. BEAL 1,831,475
AUTOMOBILE LIFTING DEVICE
Filed Aug. 21, 1929 2 Sheets-Sheet 2

INVENTOR,
Francis R. Beal,
BY Howard D. Smith,
ATTORNEY

Patented Nov. 10, 1931

1,831,475

UNITED STATES PATENT OFFICE

FRANCIS R. BEAL, OF PORT WILLIAM, OHIO

AUTOMOBILE LIFTING DEVICE

Application filed August 21, 1929. Serial No. 387,513.

This invention relates to new and useful improvements in automobile lifting devices.

It is one of the principal objects of my invention to provide an automobile lifting device which is easily operated, safe and durable. It is also compact and may be economically constructed.

It is another object of my invention to provide a lifting device upon which an automobile may be easily run and automatically locked against descent when the front or the rear end of the device is tilted downwardly.

It is another object of my invention to provide hand controlled crank means for easily tilting the channeled ramp structure to bring the automobile to a convenient position for observation and repair.

Another object of the invention is to provide a rolling support for the device so that it may be easily moved to different locations on the floor at any time, irrespective of whether it carries an automobile or not.

It is another object of my invention to provide an adjustable support which may be easily attached to the device for the purpose of holding up one end of an automobile while the runways are lowered beneath that end of it, to permit the wheels or other parts to be removed for inspection, replacement or repair.

Other important and incidental objects will be brought out in the following specification and particularly set forth in the subjoined claims.

Figure 7:
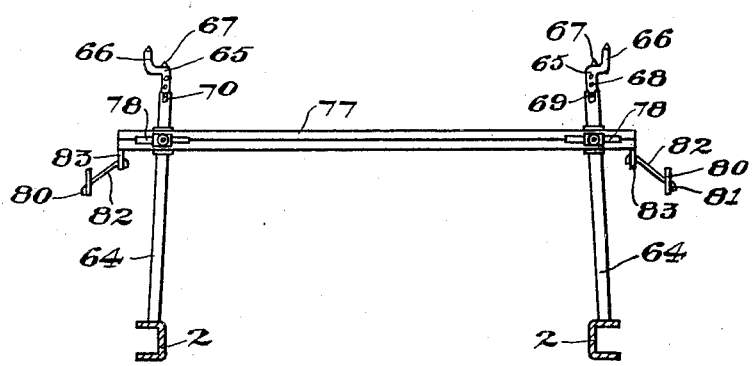
Figure 8:
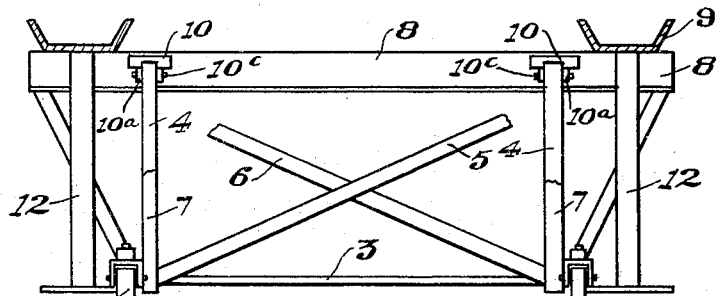
Figure 9:
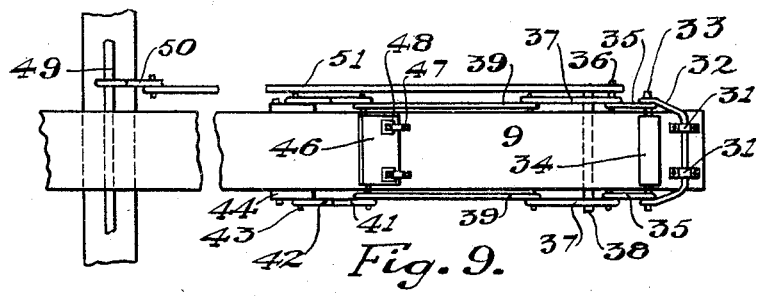

In the accompanying drawings illustrating my invention, Figure 1 is a side elevational view of my automobile lifting device. Figure 2 is a front detail view of the means for tilting the runway frame. Figure 3 is a side view of the latch means for holding the rear stops for the front wheels of the automobile in a raised position. Figure 4 is a side view of the means for holding the latch releasing lever in its down position. Figure 5 is a top plan view of the latch, lever and cam. Figure 6 is an end view of the middle portion of the attachable support to hold the automobile in a fixed position while one end of the runway frame is lowered below its wheels. Figure 7 is a side view of said support, showing how it is mounted upon the channel side beams of the truck body and attached to ears on the ramps of the lifting device. Figure 8 is a front view of my automobile lifting device. Figure 9 is a front view of one of the channel runways. And Figure 10 is a bottom view of the middle portions of the parallel runways and cross channel connecting member, showing the pivot plates and shafts secured to the latter.

Referring to the accompanying drawings for a detailed description of my invention, the numeral 1 designates a truck body having parallel side beams 2 connected at their middle portions by a cross member 3. Secured to the inner sides of the channel beams 2, at their middle portions, are the lower ends of vertical supporting members 4. Connected between the two members 4 are diagonal braces 5 and 6 which cross each other at their middle portions. Brace members 7 are connected between the upper portions of the vertical members 4 and the end portions of the side beams 2. (See Figures 1 and 8.)

The numeral 8 designates a channel cross member upon the flat portion of which there are secured two parallel channel ramps or runways 9 upon which an automobile is adapted to be run. This member 8 is pivotally secured upon the tops of the vertical members 4 by the following means to tilt the ramps.

Figure 10:
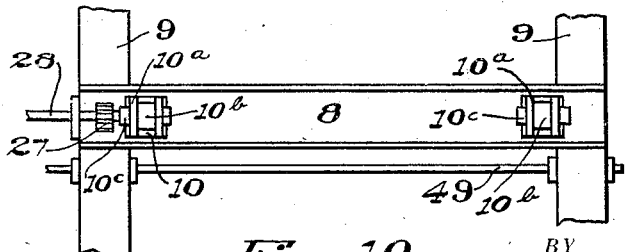

Referring to Figures 8 and 10, there are secured to the under surface of the inverted channel member 8 above the vertical members 4, pivot plates 10, each one of which is formed with two downwardly extending parallel ears 10ª. Each set of ears straddles the top of a respective vertical member 4 which projects a short distance into a wide hole 10ᵇ in the plate. A pin 10ᶜ passes through registering holes in each set of ears 10ª and a hole in the top of the vertical member 4 which they straddle, to pivotally secure the cross member 8 and the ramps 9 carried by it, for a tilting movement over the tops of the vertical supporting members 4.

In Figures 1 and 2 the numeral 11 designates a curved rack member which is flanged on the outside. Bolted to each end of this rack member is an inclined member 12, L shaped in cross section, which is secured at its upper end to its respective ramp 9. A vertical member 13 is also connected between each radial end 14 of the rack member 11 and the cross member 8.

One of the curved racks 11 depends from each ramp 9 for engagement by a pinion 15 secured to a shaft 16. At one end this shaft is supported in a hole in a vertical member 17 that is secured at its lower end to a half ring member 18 terminating in ears 19 bolted to a respective side beam 2 of the truck body.

Connected to the lower end of each vertical member 17, there being one on each side of the device, is a fixed arm 20 having an inwardly extending foot portion 21 to receive the lower end of a worm shaft 22. (See Figures 1 and 2.) On the lower end of this shaft 22 there is a worm 23 which meshes with a gear 24 on the shaft 16.

The upper end of the shaft 22 passes through a bearing member 25 secured to the upper end of the right vertical member 17. (See Figure 2.) Secured to the top of the shaft 22 is a crown gear 26 that meshes with a pinion 27 fast on a shaft 28 supported at its front end by an ear 29 attached to the right ramp 9 and at its rear end projecting into a recess in the end of the adjacent pin $10^c$.

Connected to the outer end of the shaft 28 is a crank wheel 30. When the latter is rotated in one direction, it will cause the ramp structure to be tilted one way through the rack, pinion and gear mechanism just described; and when the crank wheel is given a reverse movement, it will tilt the ramp structure in the opposite direction. The crank wheel 30 is easy to turn, even when a heavy automobile is carried by the lifting device; and by means of the crank operating mechanism an automobile may be tilted to, and firmly held in, a position where it may best be inspected, oiled, greased or repaired without danger to the person working upon it.

An automobile run upon the ramp structure, is stopped and held against descent by the following means. Pivotally secured by two hold-down straps 31 to the top surface of the front end of each ramp 9, is the horizontal portion of a yoke 32. (See Figures 1 and 9.) Each yoke terminates in eye ends to receive a shaft 33 upon which a roller 34 is freely mounted for engagement by a front wheel of an automobile driven upon the lifting device.

Pivotally secured to the shaft 33, one on each side of the roller 34, are links 35. These links are secured by pins 36 to the front ends of bell crank levers 37 pivotally secured at their central portions to a cross shaft 38 supported by ears $38^a$ attached to the runways 9. The rear ends of the bell crank levers 37 are pivotally connected to links 39 which are received at their rear ends by pins 40 that pivotally connect links 41 and 42. At their lower ends the links 42 are secured by pivots 43 to ears 44 attached to the runways 9, while the links 41 are pivotally secured at their upper ends to ears 45 on the top part of a stop plate 46. (See Figures 1 and 9.)

The stop plates 46, and their operating mechanism which will now be described, are for the purpose of automatically preventing the descent of an automobile after its front wheels have engaged the rollers 34.

The plates 46 are pivotally secured to the top surfaces of the ramps 9 by hold-down straps 47 that straddle web portions 48 at the outer ends of slots formed in the plates. (See Figure 9.) These plates lie flat upon the ramps until the front wheels of the automobile pass over them and engage the rollers 34, whereupon they are automatically raised to a vertical position behind those wheels by the links 41 and 42. This is due to the straightening out of these links by the thrust exerted on the pivot pins 40 when the links 39 are moved rearwardly by the bell crank levers 37 in response to the pull upon their front ends by the roller structures 34 when they are moved forward from their dotted line positions in Figure 1, by the front wheels of the automobile. The position of the links and bell crank levers referred to when the stop plates 46 are in their down positions is also shown in dotted lines in said figure.

When the stop plates 46 have been raised behind the front wheels of the automobile by the mechanism just described, they will be automatically held in their elevated positions to prevent the descent of the automobile, by the means now to be described. Carried by the cross member 8 of the tiltable frame is a shaft 49 to which two arms 50 are fixedly secured. Connected between the free ends of these arms and the inside pivot pins 36 are rods 51, so that when the stop plates 46 are raised, the shaft 49 will be turned to bring a latch arm 52 on its outer end opposite a notch 53 in a sector 54 fixedly secured to the right ramp 9. (See Figure 3.)

The latch arm 52 has two guiding projections $53^a$ on its outer end to traverse the sector. Below these projections there is secured to the arm 52 a latch casing 55 containing a wide latch member 56 which is urged outwardly by a spring (not shown) which it contains, into engagement with the inner edge of the sector. When the arm 52 is turned by the shaft 49 to a position opposite the notch 53, the spring 57 will snap the latch member 56 into it to hold the stop plates 46 in their raised positions.

For the purpose of releasing the latch and returning the stop plates 46 to their down positions, I provide a hand lever 58 loosely secured at its inner end to the shaft 49. Secured to the lower inner portion of this lever 58 is a curved cam 59 adapted to engage that portion of the latch member 56 which projects beyond the sector 54, to press it inwardly and out of the notch 53 when the lever is raised. This cam terminates in a ledge portion which, after the latch member 56 is pressed out of the notch 53, engages the arm 52 to turn it to the position shown in Figure 3. While the arm 52 is being moved to that position, it will turn the shaft 49 to which it is secured; and since the rods 51 are attached to the arms 50 on this shaft, they will exert a pull upon the bell crank levers 37. These levers will, in turn, through the links 39 and 41, draw the stop plates 46 down to their flat positions upon the ramps 9, leaving the front wheels of the automobile free to pass over them for descent from the device.

The hand lever 58 is then brought down to its normal position shown in Figures 3 and 4. In this position it rests upon a rod 60 which projects through holes in the lower part of the U end of a bracket piece 61 having a right angled portion attached to the ramp 9 that carries the sector 54. (See Figures 4 and 5.) The outer end of the rod 60 is hook shaped so that its free end may pass through a hole in the upper part of the outer portion of the bracket 61, and project over the lever 58. In its lever enclosing position the rod 60 is held by a coil spring 62 that surrounds it between the bracket 61 and a stop 63 on said rod. To release the lever 58, it is necessary to pull out the rod 60 against the compression of the spring 62, a sufficient distance to clear the lever, whereupon it may be raised to release the latch and return it to its normal position, as before described.

When it is desired to hold one end of the automobile up when the ramps 9 are lowered below that end, I have provided the following attachable support. Referring to Figure 6, this support comprises two tubular posts 64. Within each post there is an adjustable supporting rod 65 formed at its upper end with an offset tip 66 which terminates in a conical point for engagement with the underframe of the automobile. A pointed projection 67 is formed on the horizontal part of the offset portion of each rod to assist the pointed end of its vertical part 66 in firmly engaging the automobile from below.

Each rod 65 is also formed with a series of holes 68 to receive a pin 69 which rests in notches 70 formed in the upper edge of its respective post 64. There are preferably four of these notches 70 to permit the rod 65 to be turned to four positions where it will be fixedly held at a height determined by the hole in the rod in which the pin 69 is inserted. (See Figure 6.)

A short distance below its notched portion each post 64 has secured to it the eye end 71 of a stud 72 which terminates in a threaded portion to receive a washer 73 and a nut 74. (See Figure 6.) Each stud projects through the registering holes in two channel members 75 and 76 secured back to back, the member 75 being formed with concave portions for attachment by welding to the post.

Each channel member 76 is adapted to slidingly receive between its flanged portions the free edges of a connecting member 77 which is triangular in cross section. Near each end the connecting member 77 is formed with a slot 78 through which the stud 72 carried by its respective post 64, projects. An angle piece 79 conforming in contour to the apex part of the connecting member 77, is mounted on the front end of the stud, so that it may be forced against the connecting member by the nut 74 and washer 73. By loosening the nuts 74, the posts 64 may be laterally adjusted to the connecting member 77 through their stud and slot connection with it.

After the connecting member 77 has been properly adjusted and secured to the posts 64, the latter are ready to be set upon the side beams 2 of the truck body, under that end of the automobile that is to be held up when the ramps are lowered beneath it. For the purpose of anchoring this supporting device to the runway frame, there is secured to each runway member, near its middle portion, an ear 80 formed with a hole to receive the hook end 81 of a link 82. After they are attached, the links 82 are in a more or less horizontal position, which permits the runway carrying a vehicle to be lowered. At their inner ends the links 82 are formed with bent portions for pivotal connection to ears 83 on the ends of the member 77. By means of these links 82 the supporting frame just described is connected to the lifting device so that the projections 66 and 67 on the posts 64 will engage the underframe of the automobile. When so placed, the crank 30 may be turned to lower the ends of the ramps 9 under the end of the automobile held up by the posts, to permit the wheels on that end to be taken off and other parts removed for inspection, replacement or repair. Then, when the wheels have been replaced, the ramps 9 may again be elevated to them to support the end of the machine held up by the posts 64 in order that the latter may be removed.

Steps 84 may be removably attached to the ramps 9 by hook brackets 85. (See Figure 1.) These steps permit the operator to work conveniently upon the upper part of an automobile supported by the ramps.

Wheels 86 secured to the ends of the side beams 2 of the truck body permit it to be easily moved over the floor of a garage in any direction and at any time, whether or not an automobile is supported by the ramp structure.

I do not wish to be limited to the details of construction or arrangement herein shown and described, and any changes or modifications may be made therein within the scope of the subjoined claims.

Having described my invention, I claim:

1. A lifting device for automobiles, comprising two parallel runways, a movable support upon which said runways are tiltably mounted, stops for the front wheels of an automobile at the front ends of said runways, to prevent its forward movement beyond them, rear stops for said wheels to prevent the back movement of said automobile, and means operated by the front stops to raise the second stops behind said front wheels after the first stops have been engaged by them.

2. A lifting device for automobiles, comprising two parallel runways, a movable support upon which said runways are tiltably mounted, stops pivotally secured to the front ends of said runways for engagement by the front wheels of the automobile to prevent its forward movement beyond them, flat stops hingedly secured against the top surfaces of said runways behind the first stops, and means connected between the second and first stops to raise the latter behind the front wheels of an automobile when the first stops are engaged by said wheels.

3. A lifting device for automobiles, comprising two parallel runways, a movable support upon which said runways are tiltably mounted, stops pivotally secured to the front ends of said runways for engagement by the front wheels of the automobile to prevent its forward movement beyond them, flat stops hingedly secured against the top surfaces of said runways behind the first stops, and link means connected between the second and first stops to raise the latter behind the front wheels of an automobile when the first stops are engaged by said wheels.

4. A lifting device for automobiles, comprising two parallel runways, a movable support upon which said runways are tiltably mounted, stops pivotally secured to the front ends of said runways for engagement by the front wheels of the automobile to prevent its forward movement beyond them, flat stops hingedly secured against the top surfaces of said runways behind the first stops, a bell crank lever pivoted to each runway, a link connecting said lever with its respective front stop, a link pivotally secured to the free end of the hinged flat stop, a link pivotally connected at one end to the second link and at its other end to the runway, and a fourth link running from the point of connection of the second and third links, to the bell crank lever.

5. A lifting device for automobiles, comprising two parallel runways, a movable support upon which said runways are tiltably mounted, stops pivotally secured to the front ends of said runways for engagement by the front wheels of the automobile to prevent its forward movement beyond them, stops hingedly secured against the top surfaces of said runways behind the first stops, means connected between the second and first stops to raise the latter behind the front wheels of an automobile when the first stops are engaged by said wheels, and means operated by said connecting means to lock the second stops in their raised positions.

6. A lifting device for automobiles, comprising two parallel runways, a movable support upon which said runways are tiltably mounted, stops pivotally secured to the front ends of said runways for engagement by the front wheels of the automobile to prevent its forward movement beyond them, stops hingedly secured against the top surfaces of said runways behind the first stops, means connected between the second and first stops to raise the latter behind the front wheels of an automobile when the first stops are engaged by said wheels, and a latch device operated by said connecting means to lock the second stops in their raised positions.

7. A lifting device for automobiles, comprising two parallel runways, a movable support upon which said runways are tiltably mounted, stops pivotally secured to the front ends of said runways for engagement by the front wheels of the automobile to prevent its forward movement beyond them, stops hingedly secured against the top surfaces of said runways behind the first stops, means connected between the second and first stops to raise the latter behind the front wheels of an automobile when the first stops are engaged by said wheels, a rotatable latch device, a shaft carried by one runway, to which said latch device is secured, radial arms on said shaft, and a link connection between each arm and the connecting means between the first and second stops, whereby when the latter are raised, the rotatable latch device will be turned to a locking position.

8. A lifting device for automobiles, comprising two parallel runways, a movable support upon which said runways are tiltably mounted, stops pivotally secured to the front ends of said runways for engagement by the front wheels of the automobile to prevent its forward movement beyond them, stops hingedly secured against the top surfaces of said runways behind the first stops, means connected between the second and first stops to raise the latter behind the front wheels of an automobile when the first stops are engaged by said wheels, a member formed with a notch, secured to the side of one runway, a shaft, a radial latch casing secured to said shaft for rotation to a point opposite the notch, a latch in said casing, a spring therein for pressing the latch into the notch, radial arms on said shaft, and a link connection between each arm and the connecting means between the first and second stops, whereby when the latter are raised, the latch casing will be turned to a position opposite the notch, into which the latch will be snapped by the spring to lock the second stops in their raised positions.

9. A lifting device for automobiles, comprising two parallel runways, a movable support upon which said runways are tiltably mounted, stops pivotally secured to the front ends of said runways for engagement by the front wheels of the automobile to prevent its forward movement beyond them, stops hingedly secured against the top surfaces of said runways behind the first stops, means connected between the second and first stops to raise the former behind the front wheels of an automobile when the first stops are engaged by said wheels, a rotatable latch device operated by said connecting means to lock the second stops in their raised positions, and a hand lever for releasing said latch device and restoring it and the second stops to their normal positions.

10. A lifting device for automobiles, comprising two parallel runways, a movable support upon which said runways are tiltably mounted, stops pivotally secured to the front ends of said runways for engagement by the front wheels of the automobile to prevent its forward movement beyond them, stops hingedly secured against the top surfaces of said runways behind the first stops, means connected between the second and first stops to raise the latter behind the front wheels of an automobile when the first stops are engaged by said wheels, a sector formed with a notch, fixedly secured to the side of one runway, a shaft, a radial latch casing secured to said shaft for rotation to a point opposite the notch, a latch in said casing, in continuous engagement with the inner edge of the sector, a spring in said casing for pressing the latch into the notch, radial arms on said shaft, a link connection between each arm and the connecting means between the first and second stops, a hand lever loosely secured at its inner end to said shaft, and a cam on said lever to press the latch out of said notch and to return the latch casing to its normal position.

11. A lifting device for automobiles, comprising two parallel runways, a movable support upon which said runways are tiltingly mounted, means for tilting said runways, and a support adapted to be secured upon the movable support to hold up one end of the automobile while the runways are lowered below that end.

12. A lifting device for automobiles, comprising two parallel runways, a movable support upon which said runways are tiltably mounted, means for tilting said runways, and an adjustable post structure free to be secured upon the movable support to hold up one end of the automobile while the runways are lowered below that end.

13. A lifting device for automobiles, comprising two parallel runways, a movable support upon which said runways are tiltably mounted, means for tilting said runways, two tubular posts free to be set upon said movable support, a cross member adjustably connected to said posts, and supporting members vertically adjustable in said posts for engagement with one end of an automobile to hold up that end while the runways are lowered below it.

14. A lifting device for automobiles, comprising two parallel runways, a movable support upon which said runways are tiltably mounted, means for tilting said runways, two tubular supports free to be set upon said movable support, a cross member adjustably connected to said posts, supporting members vertically adjustable in said posts for engagement with one end of an automobile to hold up that end while the runways are lowered below it, and removable link members pivotally secured between the ends of the cross member and the runways to anchor the posts to the lifting device without interfering with the tilting of the runways.

15. A lifting device for automobiles, comprising two parallel ramps, a movable support, a cross member to which the ramps are secured, pivotal means for tiltably connecting the cross member to said support, a crank shaft, one end of which is received by said pivotal means and being secured at its other end to one of said ramps, curved racks depending from said ramps, a second shaft, pinions on said shaft for engaging said racks, and a worm and gear connection between the first and second shafts to tilt the ramps when the first shaft is turned.

In testimony whereof I have hereunto set my hand this 20th day of August, 1929.

FRANCIS R. BEAL.